United States Patent
Mahaney

[11] Patent Number: 5,829,940
[45] Date of Patent: Nov. 3, 1998

[54] BALE HANDLER ATTACHMENT AND BALE STACKING METHOD

[75] Inventor: F. Allen Mahaney, Sioux City, Iowa

[73] Assignee: Soo Tractor Sweeprake Company, Sioux City, Iowa

[21] Appl. No.: 818,932

[22] Filed: Mar. 17, 1997

[51] Int. Cl.[6] ..................................................... B66C 3/16
[52] U.S. Cl. ............................. 44/111; 414/686; 414/705; 414/723; 414/920; 294/61; 294/105; 294/107; 294/108
[58] Field of Search .................................. 414/24.5, 111, 414/686, 705, 721, 722, 723, 724, 920, 786; 294/61, 98, 120, 105, 106, 107, 108

[56] References Cited

U.S. PATENT DOCUMENTS

| | | | |
|---|---|---|---|
| 84,269 | 11/1868 | Derrick | 294/108 |
| 2,652,939 | 9/1953 | Burch . | |
| 3,529,735 | 9/1970 | Wehde . | |
| 4,073,532 | 2/1978 | Blair . | |
| 4,182,593 | 1/1980 | Sweet | 414/920 |
| 4,264,252 | 4/1981 | Jennings et al. . | |
| 4,548,535 | 10/1985 | Van Die | 294/61 |
| 4,778,330 | 10/1988 | Mailleux et al. | 294/107 |
| 4,911,491 | 3/1990 | Naaktgeboren | 294/61 |
| 5,082,413 | 1/1992 | Grosz et al. | 414/24.5 |
| 5,476,356 | 12/1995 | Weiss | 414/24.5 |

FOREIGN PATENT DOCUMENTS

| | | | |
|---|---|---|---|
| 955 550 | 1/1957 | Germany | 294/120 |

*Primary Examiner*—Karen M. Young
*Assistant Examiner*—Douglas Hess
*Attorney, Agent, or Firm*—Reising, Ethington, Learman & McCulloch

[57] ABSTRACT

The bale handler attachment (10) has a frame (26) with a base member (26), an upper member (30) parallel to the base member and a pair of connecting members (32 and 34). A pair of connector assemblies (118 and 120) are connected to the frame (26). A plurality of parallel straight tines (36) are connected to the base member (28). A right shaft (42) and a left shaft (54) are pivotally attached to the frame (26) for pivotal movement about parallel axes that are perpendicular to the axies of the straight tines (36). Arcuate tines (74 and 78) are attached to the right and left shafts (42 and 54) and are pivoted into and out of engagement with bales by a hydraulic cylinder (82). A tiebar (72) connects the upper ends of the shafts (42 and 54) and are pivoted into and out of engagement with bales by a hydraulic cylinder (82). A tie bar (72) connects the upper ends of the shaft.

23 Claims, 4 Drawing Sheets

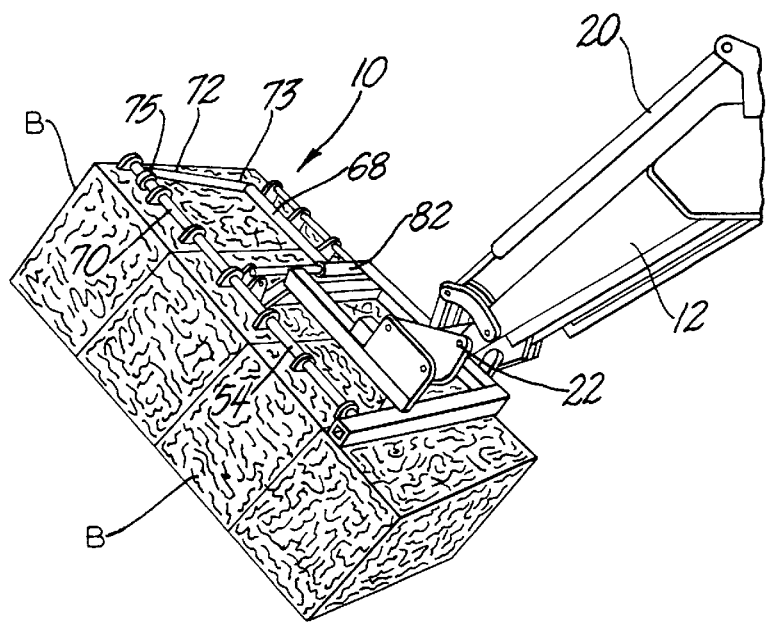
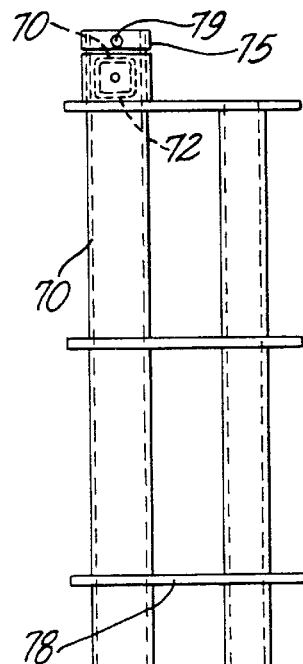
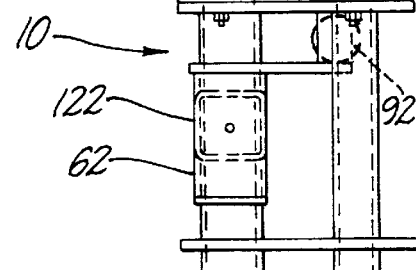
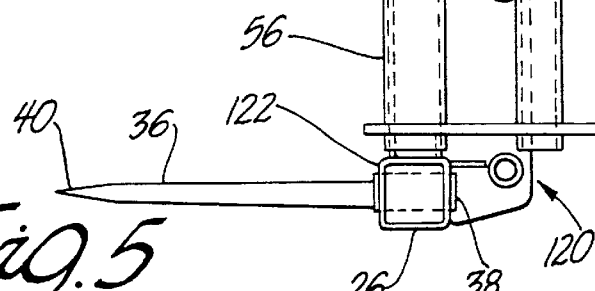
Fig. 4
Fig. 5

BALE HANDLER ATTACHMENT AND BALE STACKING METHOD

TECHNICAL FIELD

This application relates to a bale handler and more particularly to a bale handling attachment mounted on a tractor loader in place of a loader bucket, for lifting, moving and stacking large rectangular bales of hay or other organic material.

BACKGROUND OF THE INVENTION

Bale handler attachments mountable on tractor loaders have been available for a number of years. These attachments are designed to lift a plurality of bales of hay and place the bales on a vehicle for transport to a hay storage area or to a live stock feeding area.

Bales of hay are formed by balers that pick hay up from windrows in a hay field, compress the hay to reduce its volume and increase bale density, and then tie the bale to maintain the bale density and shape. The bales formed by these balers are generally rectangular or cylindrical.

Cylindrical bales are generally too heavy to be moved manually. A variety of transport systems are available for picking cylindrical bales up and moving them to a storage area or to a live stock feeding area. The machinery that makes up the transport system is often designed specifically for cylindrical bales.

Rectangular bales have generally weighed between forty five and one hundred pounds. Bales this size can be moved manually or by machinery. One system for mechanically handling small rectangular bales includes a collector that moves with the baler. The collector received formed bales from the baler, positions the bales in a group with a predetermined pattern and then deposits the bales on the ground. Tractor loaders may be equipped with bale handling attachments that can pick up a plurality of hay bales in one group simultaneously. These bale handlers have a frame that is pivotally attached to the booms of a loader where a loader bucket is normally attached. The bale handler frame is positioned on top of the group of bales and tines pivotally attached to the frame are rotated into the bale. The entire group of bales can then be lifted from the ground, carried to another location and then deposited in a stack or on a transport vehicle. The tines easily support the weight of the bales without causing a appreciable damage to the bales.

Balers for large rectangular hay bales have been available for a number of years. Large rectangular bales that are 800 centimeters (31.5 inches) by 800 centimeters by 2500 centimeters (98 inches) may weigh 1000 pounds or more. Some balers form bales that are four feet by four feet by eight feet and may weigh 2300 pounds or more depending upon hay conditions and baler adjustments. These balers have been used primarily on large commercial hay and forage farms where hay and forage are grown as a cash crop and are transported to other locations to feed livestock. The large rectangular bales are preferred when being transported a substantial distance because more hay is carried at one time. The bale handlers used with the small rectangular bales, as described above, do not work with the larger rectangular bales. The tines tend to change the shape of large bales and in some cases destroy bales. Rotatable tines entering large rectangular bales on one side can not support the bale weight during movement of the tractor to a transport vehicle or to a storage area.

SUMMARY OF THE INVENTION

An object of the invention is to provide a tractor mounted bale handler that can lift, transport, and stack multiple large rectangular bales simultaneously with minimal change in the bale shape.

Another object of the invention is to provide a bale handler attachment with fixed bale engaging tines in combination with pivoted bale engaging tines.

A further object of the invention is to provide a bale handler attachment that can lift one or more large bales, rotate the bales 90° about a horizontal axis and set the bales down in the new orientation.

The bale handler attachment has a frame with a transverse horizontal base member, an upper member parallel to the base and spaced from the base and a pair of connecting members connecting the base member and the upper member. A pair of coupler assemblies are attached to the frame for connecting the frame to a loader boom. A plurality of parallel straight tines are secured to the base member of the frame. Spaced apart parallel right and left shafts are pivotally attached to the frame for pivotal movement about axes in a plane that is perpendicular to the straight tines. A plurality of arcuate tines are attached to the right shaft and the left shaft. A hydraulic cylinder is a attached to the right shaft and the left shaft to rotate the two shafts in opposite directions. The hydraulic cylinder is expanded to drive the arcuate tines into bales and is retracted to remove the arcuate tines from bales.

The bale handler is moved until the straight tines are embedded in a bale. The hydraulic cylinder is then extended to rotate tips of the arcuate tines into the bales. The bale handler is then rotated about a horizontal axis, if necessary, to place the straight tines in a horizonal position. The bale or bales are then raised and carried to a chosen location for stacking or for feeding to live stock. The straight tines support the bales during movement. The arcuate tines hold the bales on the straight tines. The bale or bales are deposited on a vehicle or stacked. The arcuate tines are removed from the bales and then the straight tines are removed. The bale handler is then ready to secure and move additional bales.

DESCRIPTION OF THE DRAWING

The presently preferred embodiment of the invention is disclosed in the following description and in the accompanying drawings, wherein:

FIG. 4 is a reduced perspective view of a loader boom with parts broken away and a bale handler tilted to a position between vertical and horizontal; and FIG. 5 is an enlarged side elevational view of the bale handler in a vertical position.

DESCRIPTION OF THE PREFERRED EMBODIMENT

Figure 1:
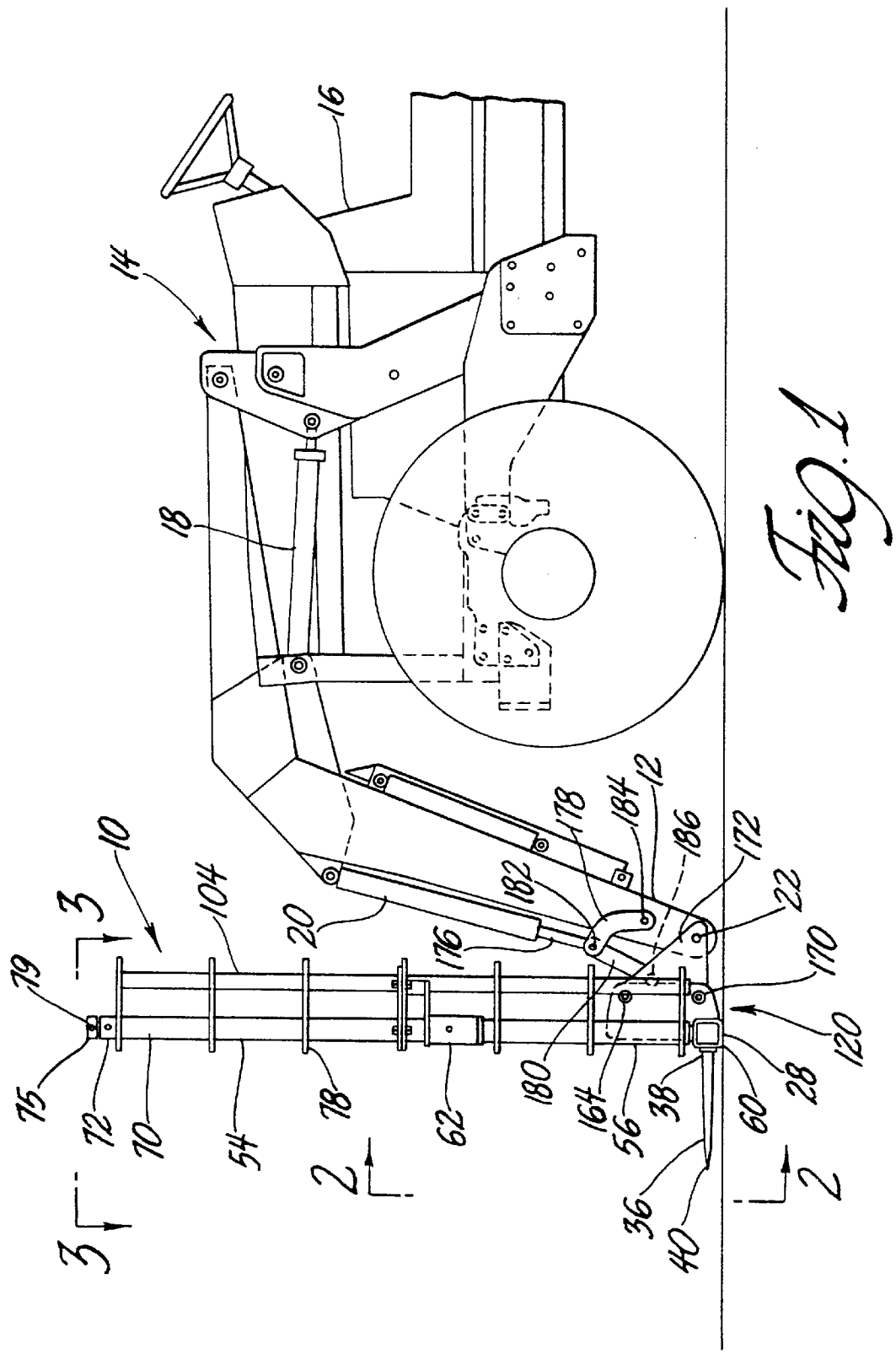
FIG. 1 is a side elevational view of the bale handler in a vertical position and a tractor with portions broken away.

The terms left, right, forward and rear as used in the following specification is as seen by a tractor operator sitting in the usual position to operate the tractor.

The bale handler 10 is attached to the boom 12 of a loader 14 mounted on a tractor 16. Hydraulic cylinders 18 raise and lower the boom 12 and the bale handler 10. Hydraulic cylinders 20 pivot the bale handler 10 relative to the boom 12 about the transverse horizontal axis of pins 22.

Bale handler 10 has a frame 26 that includes a transverse horizontal base member 28 and an upper member 30 that is parallel to the base member. Two connecting members 32 and 34 are welded to the base member 28 and the upper member 30 and hold the upper member 30 in a position spaced from and parallel to the base member. Four parallel straight tines 36 have bases 38 secured to the base member 28 of the frame 26 and pointed free ends 40. The base member 28, the upper member 30 and the connecting members 32 and 34 of the frame 26 are steel tubes with square cross-sections that are welded together as shown in the drawing figures.

A right shaft 42 has an end 44 journaled on a ring 46 welded to the right end 47 of the base member 28 of the frame 26. The ring 46 is a short section of tubular material that extends axially into the tubular right shaft 42. A mid portion of the right shaft 42 is journaled in a sleeve 48 attached to the right end 50 of the upper member 30 of the frame 26. A ring member 52 on the right shaft 42 below the sleeve 48 limits axial movement of the right shaft and holds the end 44 on the ring 46.

A left shaft 54 has an end 56 journaled on a ring 58 welded to the left end 60 of the base member 28 of the frame 26. The ring 58 is a short section of tubular material that extends axially into the tubular left shaft 54. A mid portion of the left shaft 54 is journaled in a sleeve 62 attached to the left end 64 of the upper member 30 of the frame 26. A ring member 66 on the left shaft 54 below the sleeve 62 limits axial movement of the left shaft and holds the end 56 on the ring 58. The upper end 68 of the right shaft 42 and the upper end 70 of the left shaft 54 are journaled in a tie bar 72, shown in FIGS. 4 and 5, that the holds the upper ends in fixed positions relative to each other. Sleeves 73 and 75 attached to the upper ends 68 and 70 by bolts 79 retain the tie bar 72 on the shafts 42 and 54.

A plurality of right arcuate tines 74 are welded to the right shaft 42 and are evenly spaced along the length of the right shaft. Free ends 76 of the tines 74 are pointed to facilitate penetration into dense bales of hay and other crop material.

A plurality of left arcuate tines 78 are welded to the left shaft 54 and are evenly spaced along the length of the left shaft. Free ends 80 of the tines 78 are pointed to facilitate penetration of dense bales of hay and other crop material.

A hydraulic cylinder 82 has its rod 84 pivotally attached to a boss 86 on one of the right arcuate tines 74 on the center portion of the right shaft 42, by a pin 88. The pin 88 also passes through a torque arm 90 welded to the right shaft 42. The hydraulic cylinder 82 has its head end 92 pivotally attached to a boss 94, on one of the left arcuate tines 78 on the center portion of the left shaft 54, by a pin 96. The pin 96 also passes through a torque arm 98 welded to the left shaft 54. As shown, the hydraulic cylinder 82 is about half way between the ends of the shafts 42 and 54. The cylinder can be located any place along the length of the shafts 42 and 54 if the shafts have sufficient torsional rigidity. The torque arms 90 and 98 transmit axial loads from the shafts 42 and 54 to the frame 26 through the sleeves 48 and 62.

Figure 3:
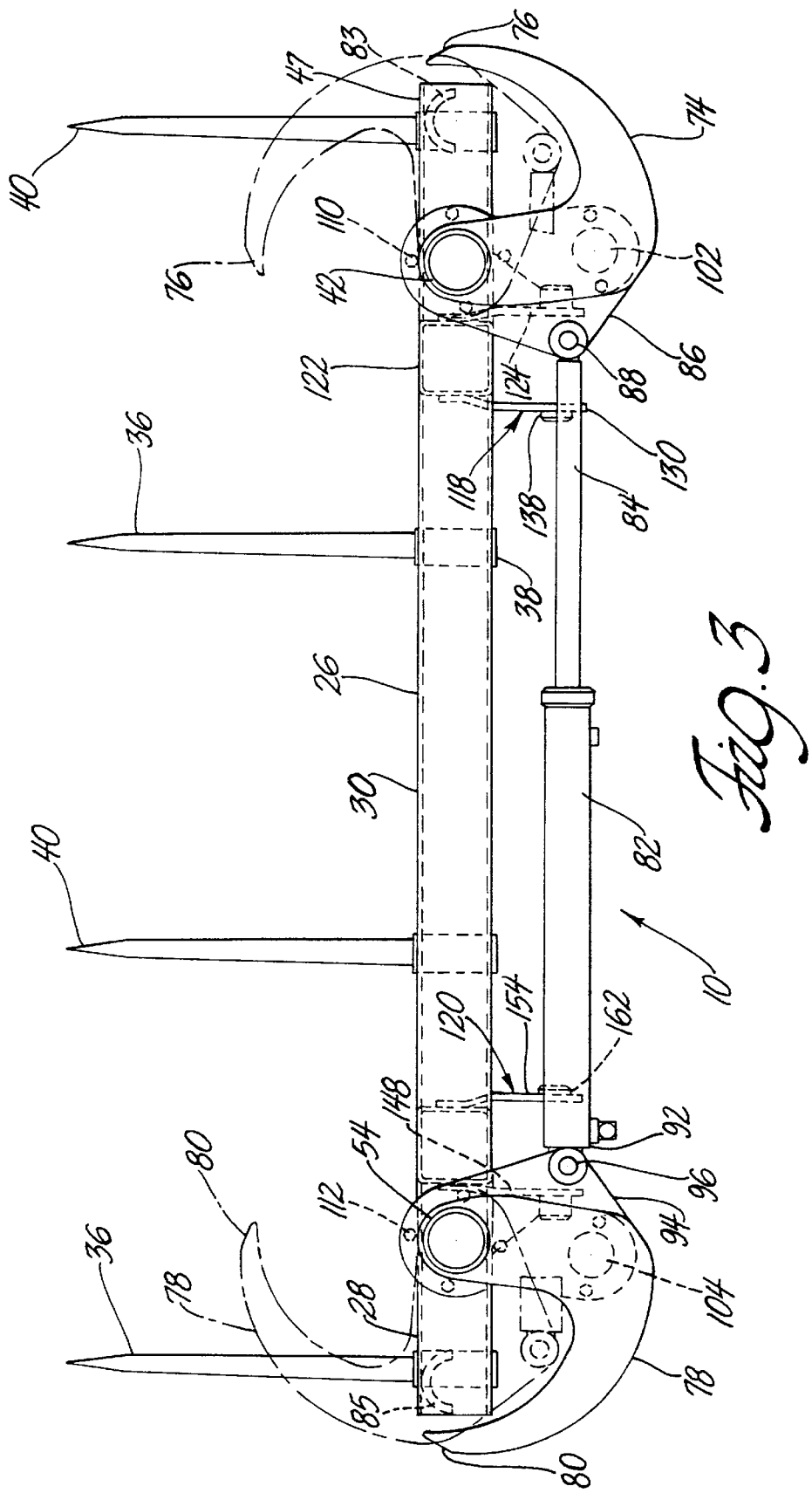
FIG. 3 is an enlarged top plan view of the bale handler with the toptie bar removed.

Extension of the hydraulic cylinder 82 pivots the right shaft 42 counter clockwise and pivots the left shaft 54 clockwise as shown in FIG. 3. This movement of the right and left shafts 42 and 54 moves the free ends 76 and 80 of the arcuate tines 74 and 78 outwardly toward the free ends 40 of the straight tines 36. As the free ends 76 and 80 of the arcuate tines 74 and 78 move in arcuate paths toward the free ends 40 of the straight tines 36, they penetrate into one or more bales. The full line position of the arcuate tines 74 and 78 is their position when the hydraulic cylinder 82 is retracted. The phantom line position shown in FIG. 3 is the position of the tines 74 and 78 when the hydraulic cylinder 82 is extended. Stops 83 and 85 on the base member 28 limit maximum penetration of the tines 74 and 76 into a bale, as explained below. Retraction of the hydraulic cylinder 82 reverses the direction of pivotal movement of the right shaft 42 and the left shaft 54 from that which occurs when the hydraulic cylinder is extended as described above. Stop surfaces 100 on the two bottom arcuate tines 74 and 78 contact plates 124 and 148 on the frame 26 to limit pivotal movement of the right and left shafts 42 and 54 and insure that all the arcuate tines are fully withdrawn from bales.

Three 1000 pound bales B or two 2300 pound bales may place a substantial bending load on the arcuate tines 74 and 78 when the bales are supported with the bale handler generally vertical as shown in FIGS. 1, 2, 3, and 5. Reinforcing rods 102 and 104 pass through apertures through the arcuate tines 74 and 78 and are welded in place to reinforce and strengthen the arcuate tines. When the arcuate tines 74 and 78 are fully inserted into a bale, the bottom ends of rods 102 and 104 are adjacent to the stops 83 and 85 respectively and the top of the base member 28. Deflection of the tines 74 and 78 is limited by contact between the rods 102 and 104 and the base member 28.

Joints 106 and 108 may be provided in the shafts 42 and 54 and reinforcing rods 102 and 104 if desired. These joints 106 and 108 are on the side of the sleeves 48 and 62 and the arcuate tines 74 and 78 with the bosses 86 and 94 remote from the ends 44 and 56 of the shafts 42 and 54. The bolts 110 and 112 can be removed to release the joints 106 and 108 and remove the ends 68 and 70 of the shafts 42 and 54. Removal of the ends 68 and 70 also removes the tie bar 72. It is desirable to remove the ends 68 and 70 of the shafts 42 and 54 to reduce the package size for shipping. It may also be desirable to use the bale handler 10 with ends 68 and 70 removed when moving bales into and out of buildings with limited overhead space. The bale handler 10 is employable with the ends 68 and 70 removed but cannot move as many bales at one time.

Figure 2:
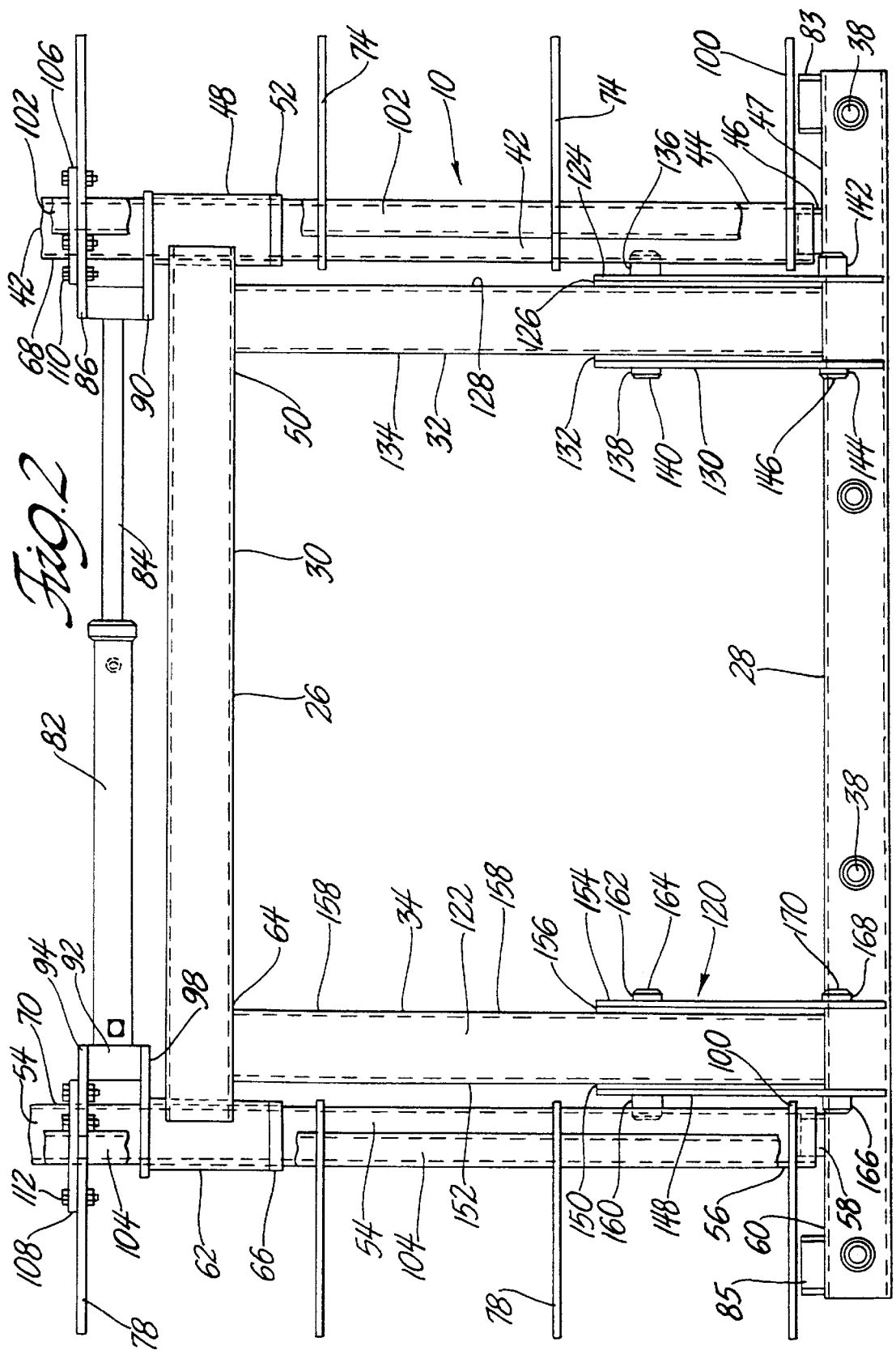
FIG. 2 is an enlarged rear elevational view of the bale handler with the upper portion broken away and portions of the tine reinforcing rods broken away.

Connecting assemblies 118 and 120, integral with the frame 26, are provided to connect the bale handler 10 to a loader 14. The connecting assemblies 118 and 120 are between the right and left shafts 42 and 54 and position the pins about which the bale handler 10 pivots relative to the boom 12 of a loader 14, adjacent to a plane through the bale contact surface 122 on the frame 26. This position places bales to be lifted as close to the tractor 16 as possible. In this position the tractor has maximum lifting ability and maximum stability. Stability and lifting capacity are very important when moving relatively large bales with a relative small tractor. The connector assembly 118 includes an outside plate 124 that is welded to a spacer plate 126, as shown in FIG. 2. The spacer plate 126 is welded to an outside surface 128 of the connecting member 32 and to the base member 28 of the frame 26. The outside plate 124 is also welded to the base member 28. An inside plate 130 is welded to a spacer plate 132. The spacer plate 132 is welded to an inside surface 134 of the connecting member 32 and to the base member 28 of the frame 26. Gudgeons 136 and 138 in the plates 124 and 130 receive an upper connector pin 140. Gudgeons 142 and 144 in the plates 124 and 130 receive a lower connector pin 146 that is adjacent to the base member 28.

The connector assembly 120 includes an outside plate 148 that is welded to a spacer plate 150. The spacer plate 150 is welded to an outside surface 152 of the connecting member 34 and to the base member 28 of the frame 26. The outside plate 148 is also welded to the base member 28. An inside plate 154 is welded to a spacer plate 156. The spacer plate 156 is welded to an inside surface 158 of the connecting member 34 and to the base member 28 of the frame 26. Gudgeons 160 and 162 in the plates 148 and 154 receive an upper connector pin 164 which is coaxial with the upper connector pin 140. Gudgeons 166 and 168 in the plates 148 and 154 receive a lower connector pin 170 that is adjacent to the base member 28 and coaxial with the lower connector pin 146. Modified connecting assemblies 118 and 120 are shown in FIG. 3. The modified connector assemblies 118 and 120 eliminate the spacer plates 126, 132, 150 and 156 decrease weight and decrease strength.

A left connector block 172 is pivotally attached to the boom 12 by a pin 22 and a right connector block 172 is pivotally attached to the boom 12 and by a pin 22. The right connector block 172 is received between the plates 124 and 130 and secured by the connector pins 140 and 146. The left connector block 172 is received between the plates 148 and 154 and secured by connector pins 164 and 170.

Both connector blocks 172 are pivoted about pins 22 by hydraulic cylinders 20. Each hydraulic cylinder 20 has a rod 176 that is pivotally attached to pairs of links 178 and 180 by a pin 182. The pairs of links 178 are also pivotally attached to the boom 12 by pins 184. Each pair of links 180 is also pivotally attached to the connector blocks 172 by pins 186. This arrangement of the links 178 and 180 increases the range of pivotal movement of the connector blocks 172 about the coaxial pins 22.

During operation of the bale handler 10 the straight tines 36 are inserted into a bale first and then the hydraulic cylinder 82 is extended to rotate the shafts 42 and 54 and force the tines 74 and 78 into one or more bales. Then the bale handler 10 is pivoted about a transverse horizontal axis of pins 22 until the straight tines 36 are generally horizontal. The bales can then be transported by the tractor 16 to a discharge position. At the discharge position, the bales are deposited in the desired position with the straight tines 36 horizontal or vertical, the hydraulic cylinder 82 is retracted to withdraw the arcuate tines 74 and 78 from the bales and then the straight tines 36 are removed from a deposited bale. The bale handler 10 is then ready to be moved to another location to handle more bales.

The straight tines 36 can be moved horizontally into or out of bales. The straight tines 36 can also be moved vertically into and out of bales. The orientation of the straight tines 36 when they are forced into or withdrawn from a bale depends upon the orientation of a bale when it is picked up and the desire orientation when it is released. The bale handler 10 can rotate a bale 90° about a horizontal axis each time the bale is picked up or sat down. Changes in orientation can be made when a bale is picked up or when it is deposited. However, if bales are to be transported more than a short distance by the handler the straight tines 36 should be horizontal during movement to limit bale deformation and damage.

It is to be understood that the embodiments described are exemplary of various forms of the invention only and that the invention is defined in the appended claims which contemplate various modifications within the spirit and scope of the invention.

I claim:

1. A bale handler attachment comprising a frame with a bale contact surface in a common plane on a bale support side of said frame;

a coupler assembly integral with the frame for attaching the frame to a loader boom;

a plurality of straight tines parallel to a first axis and each straight tine having a base secured to the frame and free ends on a first side of the common plane;

a right side shaft pivotally secured to the frame and pivotal about a second axis perpendicular to the first axis and parallel to the common plane; a left side shaft pivotally secured to the frame and pivotal about a third axis that is parallel to and spaced from the second axis and parallel to the common plane, a plurality of right side arcuate tines each having a base secured to the right side shaft and a free end tip, a plurality of left side arcuate tines each having a base secured to the left side shaft and a free end tip and wherein the second axis and the third axis are on a second side of the common plane; and at least one hydraulic actuator operable in a first direction to rotate the right side shaft and the left side shaft in opposite directions relative to each other and move the free end tips of the right side arcuate tines and the free end tips of the left side arcuate tines toward a bale engaging position and wherein the at least one hydraulic actuator is operable in a second direction to rotate the right side shaft and the left shaft in opposite directions relative to each other and retract the free end tips of the right side arcuate tines and the free end tips of the left side arcuate tines from a bale engaging position and to the second side of the common plane.

2. A bale handler attachment as set forth in claim 1 wherein the at least one hydraulic actuator includes a linear actuator with a right end pivotally attached to the right side shaft at a location spaced from the second axis, a left end pivotally attached to the left side shaft at a location spaced from the third axis, and wherein extension of the linear actuator pivots the right side shaft in one direction and pivots the left side shaft in an opposite direction.

3. A bale handler attachment as set forth in claim 1 wherein the coupler assembly integral with the frame includes a pair of spaced apart connectors positioned between the right side shaft and the left side shaft.

4. A bale handler attachment as set forth in claim 1 wherein the frame has a base member with a bale contact surface, an upper frame member with an upper bale contact surface and the base bale contact surface and the upper frame contact surface define the bale support side of the frame.

5. A bale handler attachment as set forth in claim 1 wherein the coupler assembly integral with the frame includes a pair of spaced apart connectors positioned between the right side shaft and the left side shaft and adjacent to the bale support side of the frame.

6. A bale handler attachment as set forth in claim 1 wherein the frame comprises a base frame member, an upper frame member spaced from the base frame member, a pair of connecting frame members secured to the base frame member and to the upper frame member.

7. A bale handler attachment as set forth in claim 6 wherein the coupler assembly includes a right connector secured to one of the pair of connecting frame members and a left connector secured to the other said pair of connecting frame members.

8. A bale handler attachment as set forth in claim 7 wherein the right connector and the left connector are also secured to the base frame member.

9. A bale handler attachment as set forth in claim 7 wherein the plurality of straight tines are secured to the base frame member.

10. A bale handler attachment as set forth in claim 6 wherein the right side shaft is pivotally attached to the base frame member and the upper frame member, the left side shaft is pivotally attached to the base frame and the upper frame member, and the pair of connecting frame members are between the right side shaft and the left side shaft.

11. A bale handler as set forth in claim 1 wherein one end of the right side shaft is pivotally attached to the frame, a mid portion of the right side shaft is pivotally attached to the frame, one end of the left side shaft is pivotally attached to the frame, a mid portion of the left side shaft is pivotally attached to the frame, and another end of the right side shaft and another end of the left side shaft are pivotally connected to a tie bar that limits separation of said another end of the right side shaft from said another end of the left side shaft.

12. A bale handler attachment as set forth in claim 11 wherein the right side shaft has a right shaft joint between the pivotal attachment of the mid portion of the right side shaft to the frame and the tie bar, and the left side shaft has a left shaft joint between the pivotal attachment of the mid portion of the left side shaft to the frame and the tie bar.

13. A bale handler attachment as set forth in claim 12 wherein the right shaft joint and the left shaft joint can be disassembled and the bale handler can be operated with the right side shaft shortened, the left side shaft shortened, and with the tie bar removed.

14. A bale handler attachment as set forth in claim 12 wherein the right shaft joint and the left shaft joint can be disassembled and the bale handler can be operated with the right side shaft shortened, the left side shaft shortened, and with the tie bar removed.

15. A bale handler attachment as set forth in claim 1 wherein the frame has a base member and the bases of the plurality of straight tines are secured to the base member.

16. A bale handler attachment as set forth in claim 15 wherein an end of the right side shaft is pivotally secured to the base member and an end of the left side shaft is pivotally secured to the base member.

17. A bale handler attachment as set forth in claim 1 wherein the frame has a base member with an end of the right side shaft pivotally secured to the base member and an end of the left side shaft pivotally secured to the base member.

18. A method of moving and stacking rectangular hay bales with a bale handler having a frame, a coupler assembly integral with the frame, a plurality of straight tines parallel to a first axis and each straight tine having a base secured to the frame, a right side shaft pivotally secured to the frame and pivotal about a second axis perpendicular to the first axis, a left side shaft secured to the frame and pivotal about a third axis that is parallel to and spaced from the second axis, a plurality of right side arcuate tines secured to the right side shaft, a plurality of left side arcuate tines secured to the left side shaft, and at least one hydraulic actuator operable to move the right side arcuate tines and the left side arcuate tines toward a bale engaging position and wherein the at least one hydraulic actuator is operable in a second direction to move the right side arcuate tines and the left side arcuate tines from said bale engaging position, and wherein the bale handler is attached to the boom of a tractor mounted loader for pivotal movement relative to the tractor about a horizontal axis and for up and down movement relative to the tractor, the method comprising the steps of:

a. pivoting the bale handler about the horizontal axis to position the plurality of fixed tines in a position to be inserted into a chosen side of a bale, b. inserting the plurality of fixed tines into a first side of a bale until a bale contact surface in a common plane on the frame contacts the first side of the bale;

c. rotating the right side shaft and the left side shaft of the bale handler to force the arcuate tines into the bale on a first side of the common plane;

d. rotating the bale handler as required about the horizontal axis to place the fixed tines in a generally horizontal position;

e. moving the bale to a stack forming location;

f. rotating the bale handler about the horizontal axis as required to place to bale in a desired orientation;

g. placing the bale on a stack;

h. rotating the right side and the left side shaft of the bale handler to remove the arcuate tines from the bale and to a position on a second side of the common plane; and i. removing the straight tines from the bale.

19. A method of moving and stacking rectangular hay bales with a bale handler as set forth in claim 18 further including the step of:

i. rotating the right side shaft and the left side shaft of the bale handler to force the arcuate tines into a plurality of bales, and rotating the right side shaft and the left shaft of the bale handler to remove the arcuate tines from a plurality of bales after the bales have been placed on a stack.

20. A bale handler attachment comprising a frame with a bale support side;

a coupler assembly integral with the frame for attaching the frame to a loader boom;

a plurality of straight tines parallel to a first axis and each straight tine having a base secured to the frame;

a right side shaft pivotally secured to the frame and pivotal about a second axis perpendicular to the first axis, a left side shaft pivotally secured to the frame and pivotal about a third axis that is parallel to and spaced from the second axis, a plurality of right side arcuate tines each having a base secured to the right side shaft and a free end tip, a plurality of left side arcuate tines each having a base secured to the left side shaft and a free end tip;

at least one hydraulic actuator operable in a first direction to rotate the right side shaft and the left shaft in opposite directions relative to each other and move the free end tips of the right side arcuate tines and the free end tips of the left side arcuate tines toward a bale engaging position and wherein the at least one hydraulic actuator is operable in a second direction to rotate the right side shaft and the left shaft in opposite directions relative to each other and retract the free end tips of the right side arcuate tines and the free end tips of the left side arcuate tines form said bale engaging position; and wherein one end of the right side shaft is pivotally attached to the frame, a mid portion of the right side shaft is pivotally attached to the frame, one end of the left side shaft is pivotally attached to the frame, a mid portion of the left side shaft is pivotally attached to the frame, and another end of the right side shaft and another end of the left side shaft are pivotally connected to a tie bar that limits separation of said another end of the right side shaft from said another end of the left side shaft.

21. A bale handler attachment as set forth in claim 20 wherein the right side shaft has a right shaft joint between the pivotal attachment of the mid portion of the right side shaft to the frame and the tie bar, and the left side shaft has a left shaft joint between the pivotal attachment of the mid portion of the left side shaft to the frame and the tie bar.

22. A bale handler attachment comprising a frame with a bale support side;

a coupler assembly integral with the frame for attaching the frame to a loader boom;

a plurality of straight tines parallel to a first axis and each straight tine having a free end and a base secured to the frame and wherein the free ends of the plurality of straight tines are simultaneously insertable into a first side of a rectangular bale until the first side contacts the bale support side of the frame;

a right side shaft pivotally secured to the frame and pivotal about a second axis perpendicular to the first axis, a left side shaft pivotally secured to the frame and pivotal about a third axis that is parallel to and spaced from the second axis, a plurality of right side arcuate tines each having a base secured to the right side shaft and a free end tip, a plurality of left side arcuate tines each having a base secured to the left side shaft and a free end tip;

at least one hydraulic actuator operable in a first direction to rotate the right side shaft and the left side shaft in opposite directions relative to each other and move the free end tips of the right side arcuate tines and the free end tips of the left side arcuate tines toward a bale engaging position and wherein the at least one hydraulic actuator is operable in a second direction to rotate the right side shaft and the left shaft in opposite directions relative to each other and retract the free end tips of the right side arcuate tines and the free end tips of the left side arcuate tines from said bale engaging position and from the first side of the rectangular bale while the first side of the rectangular bale is in contact with the bale support side of the frame; and stop members on the frame that limit penetration of the right side arcuate tines into a bale and penetration of the left side arcuate tines into said bale.

23. A bale handler attachment as set forth in claim 22 including stop surfaces on the frame that limit rotation of the right side shaft and the left shaft in the directions that withdraw the right side arcuate tines and the left side arcuate tines from the bale.

* * * * *